Feb. 19, 1924.

J. V. ROBINSON 1,484,082

AUTOMATIC TRAIN PIPE CONNECTER

Original Filed Dec. 6, 1919    2 Sheets-Sheet 1

Inventor
Joseph V. Robinson
By his Attorneys
Foster, Freeman, Watson & Coit

Feb. 19, 1924.

J. V. ROBINSON 1,484,082

AUTOMATIC TRAIN PIPE CONNECTER

Original Filed Dec. 6, 1919    2 Sheets-Sheet 2

Joseph V. Robinson, Inventor

By his Attorneys
Foster, Freeman, Watson & Coit

Patented Feb. 19, 1924.

1,484,082

UNITED STATES PATENT OFFICE.

JOSEPH V. ROBINSON, OF NEW HAVEN, CONNECTICUT.

AUTOMATIC TRAIN-PIPE CONNECTER.

Application filed December 6, 1919, Serial No. 343,101. Renewed May 15, 1923.

*To all whom it may concern:*

Be it known that I, JOSEPH V. ROBINSON, a citizen of the United States, and a resident of the city of New Haven, State of Connecticut, have invented certain new and useful Improvements in Automatic Train-Pipe Connecters, of which the following is a specification.

My invention relates to improvements in automatic train pipe connecters and has for its object to provide a simple, improved support for such connecters in which the universal joint of the support shifts along the bracket thereof as the cars couple. Other novel features of my invention are described in the following specification and illustrated in the accompanying drawings, in which—

Figure 1:
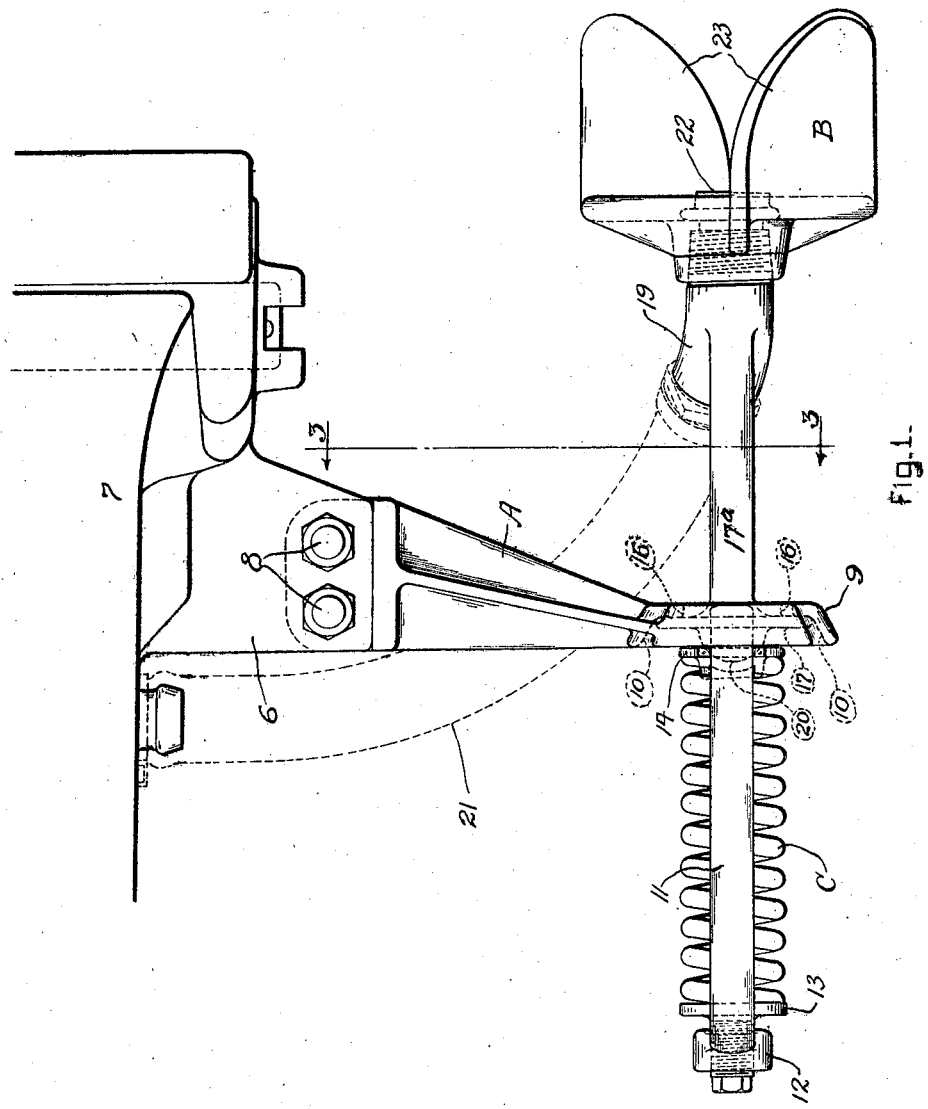
Figure 1 is a side elevation of my improvement.
Figure 2:
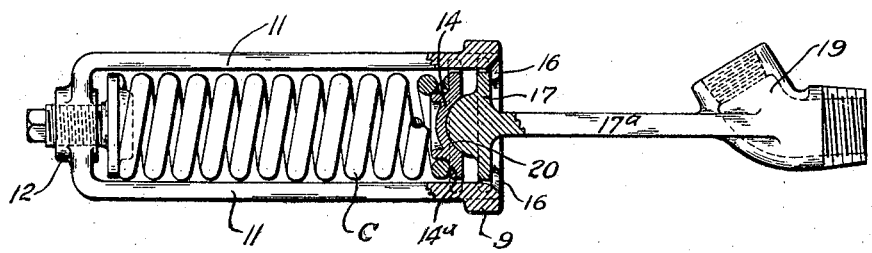
Figure 2 is a plan view of the structure shown in Figure 1, some of the parts being in sections.
Figure 4:
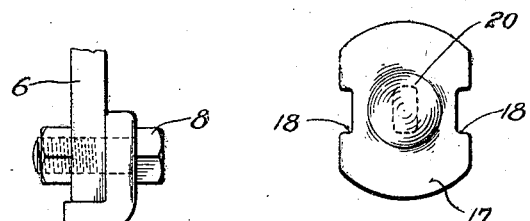
Figure 4 is a rear view of the flange comprising a part of my improvement.
Figure 5:
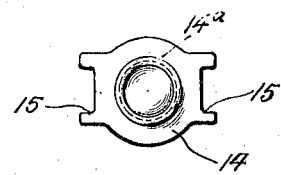
Figure 5 is a face view of the member of my improvement.
Figure 3:
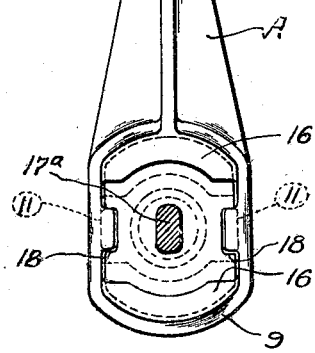
Figure 3 is a rear elevation of the bracket of my improvement, the coupling head not being shown.

Referring now to the drawings: My improved support comprises a bracket A suitably connected with a lug 6 of the coupler 7 as by bolts 8 as shown, and having a hollow base 9 provided with a forwardly tapering inner wall 10 and also provided at its front with inwardly extending projections 16. The base 9 is oblong in outline as shown, and is provided with a rearwardly extending yoke comprising side walls or arms 11 disposed on the horizontal center line of the connecter and formed preferably integral with the base 9. At its rear end the yoke is provided with a perforated cylindrical boss 12 which threadingly receives an abutment 13 adapted to be adjusted axially of the connecter in said boss. A flange 17 conforming in outline to the interior of the base 9 is mounted therein, this flange carrying a forwardly projecting bar 17ª which is connected to the coupling head B. The flange 17 is provided at its sides with grooves or notches 18 to receive the side walls or arms 11 of the yoke and thus prevent undue rotation of the coupling head B about its longitudinal axis. Upon the rear face of the flange 17 I form a partly spherical convex seat 20 adapted to socket with a semi-spherical concave seat formed in the thrust member 14 arranged at the rear of the flange 17. The member 14 is also provided at its sides with grooves or notches 15, adapted to receive the walls of the yoke 11 and maintain the member and the buffer spring C in the correct service position. Suitably connected with the bar 17ª I provide a fluid conduit 19 which connects with the coupling head B and diverges laterally thereof, and upon the annular seat 14ª formed on the thrust member 14 I mount a suitable buffer spring C, the rear end of which is supported by the abutment 13. The spring C is normally under sufficient compression to maintain the flange 17 in engagement with the inwardly projecting portions 16 of the base, and thus flexibly maintain the coupling head B in the normal horizontal position.

The supporting members of my improvement are assembled by passing the flange 17 into the base from the front thereof and at an angle of a approximately 45°, after which the flange is righted and drawn forward into engagement with the inwardly extending projections 16. The thrust member 14 is then inserted and seated upon the semi-spherical seat 20 of the flange 17. The spring C is then positioned between the members 11 of the yoke, after which the abutment 13 is adjusted through the medium of the threads thereon until the spring is placed under sufficient compression to support the coupling head B with the required resistance. Any suitable form of coupling head B may be used with my approved support, and any desired type of connection employed for connecting the train pipe of the car to the conduit 19. I show at 21 a section of the air hose now universally in use on railway cars, though flexible metallic pipe or similar means of connection may be used. Suitably mounted in the face of the coupling head B, I provide a gasket 22 having communication with the conduit 19 and adapted to mate with a complementary gasket in an opposing coupling head.

In operation the guiding prongs 23 of the coupling head B bring mating connecters into alignment so that the gaskets 22 thereof will be brought into proper register. This operation takes place in advance of final coupling of the cars, so that as the cars move to complete their coupling operation the flange 17 of my improvement is pushed rearwardly against the tension of the spring C and out of engagement with the projections 16, the grooves 18 in the flange cooperating with the walls 11 of the yoke to support the flange in the service position, while similar engagement of the walls 11 with the grooves 15 in the thrust member 14 serve to maintain the member and the spring in the service position. This rearward movement of the flange 17 releases the universal joint, and the coupling head may therefore move freely in all required directions to accommodate itself to the movement of the car. It will be observed that the flange 17 and the thrust member 14 travel along the walls 11 of the yoke and are by it maintained in the service position, as aforesaid.

What I claim is new and desire to secure by Letters Patent of the United States, is—

1. In an automatic train pipe connecter, a coupling head, a hollow base, a flange mounted in said base and rigidly connected to said head, a yoke rigidly connected to the base and extending rearwardly thereof and comprising spaced arms, a thrust member positioned at the rear of said flange and relative to which said flange has universal movement, a spring arranged in said yoke for holding said thrust member against said flange, said flange and thrust member being slidably and non-rotatably associated with said yoke, and means on said base for limiting the forward movement of said flange.

2. In an automatic train pipe connecter, a hollow base having a yoke secured thereto and extending rearwardly thereof, said yoke comprising spaced arms, a thrust member slidably and non-rotatably mounted between said arms, a flange mounted in said hollow base in front of said thrust member, said flange being movable universally relative to said thrust member, cooperating means on said flange and yoke for preventing rotation of said flange on a longitudinal axis, an adjustable abutment at the rear of said yoke, a spring arranged between the arms of said yoke and bearing against said abutment and said thrust member, projections on said base for limiting the forward movement of said flange, a coupling head, and means connecting said flange to said head.

3. In an automatic train pipe connecter, a hollow base having a yoke rigidly secured thereto and extending rearwardly thereof, said yoke comprising spaced portions, a thrust member and a flange arranged between the spaced portions of the yoke and each having notches engaging such spaced portions, said thrust member having a socket and said flange having a projecting seat adapted to enter said socket whereby said flange may move universally relative to the thrust member, a spring arranged between the spaced portions of the yoke and bearing against said thrust member, means for limiting the forward movement of said flange in the base, a coupling head, and means rigidly connecting said head to said flange.

4. In an automatic train pipe connecter, a hollow base having a yoke rigidly secured thereto and extending rearwardly thereof, said yoke including spaced arms, an adjustable abutment at the rear end of the yoke, a coiled spring arranged between said arms, said spring being insertable in and removable from the yoke when said abutment is retracted, a flange slidably mounted in said base, a thrust member slidably mounted at the rear of said flange, the forward end of said spring being arranged to contact with said member, means for preventing rotation of said flange and thrust member about a longitudinal axis, a coupling head, a bar rigidly connected to said head and said flange, said flange being movable universally relative to said thrust member.

5. In an automatic train pipe connecter, a hollow base, a flange slidably mounted therein, a thrust member slidably mounted at the rear of said flange, said thrust member having a concave seat on its front face and said flange having a convex seat on its rear face for engaging said seat, whereby said flange may move universally with reference to said thrust member, means for preventing rotation of said flange and thrust member about their longitudinal axis, a yoke extending rearwardly from said base and having spaced arms, a coiled spring arranged between said arms and bearing against said thrust member, a coupling head and means rigidly connecting said head to said flange.

In testimony whereof I hereby affix my signature.

JOSEPH V. ROBINSON.